March 23, 1948. D. W. STROM 2,438,235
MEANS FOR CLAMPING MACHINE PARTS TO BEDS
Filed April 25, 1945 2 Sheets-Sheet 1

INVENTOR.
David W. Strom
BY
Parker, Crochnow & Farmer,
Attorneys

March 23, 1948. D. W. STROM 2,438,235
MEANS FOR CLAMPING MACHINE PARTS TO BEDS
Filed April 25, 1945 2 Sheets-Sheet 2
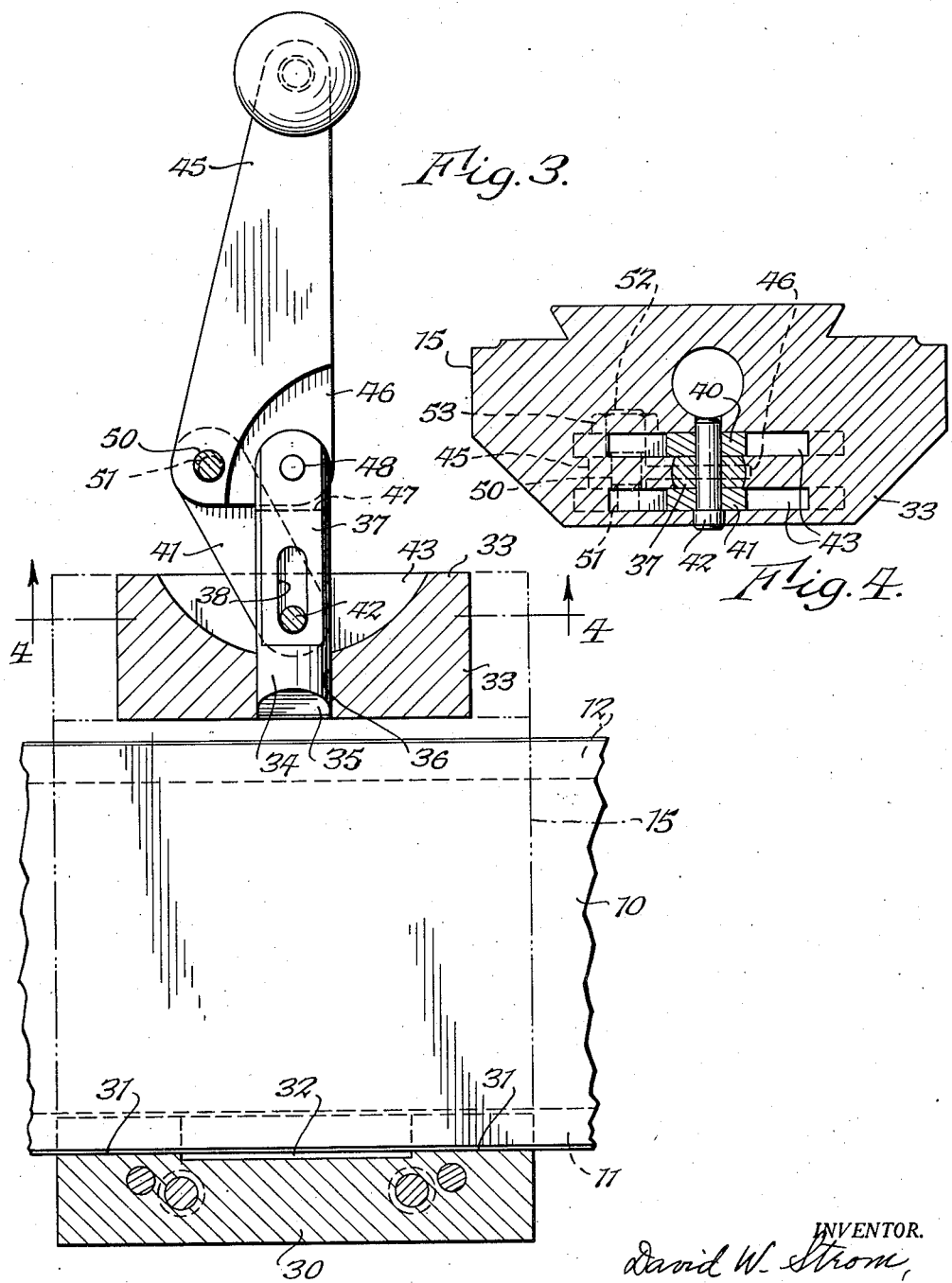
INVENTOR.
David W. Strom,
BY
Parker, Prochnow & Farmer,
Attorneys Patented Mar. 23, 1948

2,438,235

UNITED STATES PATENT OFFICE 2,438,235

MEANS FOR CLAMPING MACHINE PARTS TO BEDS

David W. Strom, Elmira, N. Y., assignor to Hardinge Brothers, Inc., Elmira, N. Y.

Application April 25, 1945, Serial No. 590,269

6 Claims. (Cl. 29—1)

1

This invention relates to improvements in means for removably securing machine parts to a bed of a machine.

One of the objects of this invention is to provide clamping means of improved construction for securing a machine part to a bed of substantially dove-tailed cross section. A further object is to provide clamping means of this type by which a machine part can be clamped on a bed with a high degree of accuracy. A further object is to provide clamping means of this type which may be moved into an inoperative position in which the machine part may be removed from the bed. A further object is to provide a clamping mechanism operating on the principle of toggle links and by means of which the clamping and releasing may be effected by the swinging of a handle or lever. It is also an object to provide a clamping mechanism of this kind in which the parts when in clamping position will also be in dead center position, so that they will remain in clamping position until released at will. It is also an object of this invention to provide improved means for adjusting the clamping mechanism so that the same exerts the desired clamping pressure against the bed of the machine.

Other objects and advantages of this invention will appear from the following description and claims.

In the accompanying drawings, in which the invention is by way of example shown as applied to the securing of a slide rest on the bed of a lathe:

Fig. 3 is a sectional plan view thereof, on line 3—3, Fig. 2.

Fig. 4 is a fragmentary sectional view thereof, on line 4—4, Fig. 3.

Figure 1:
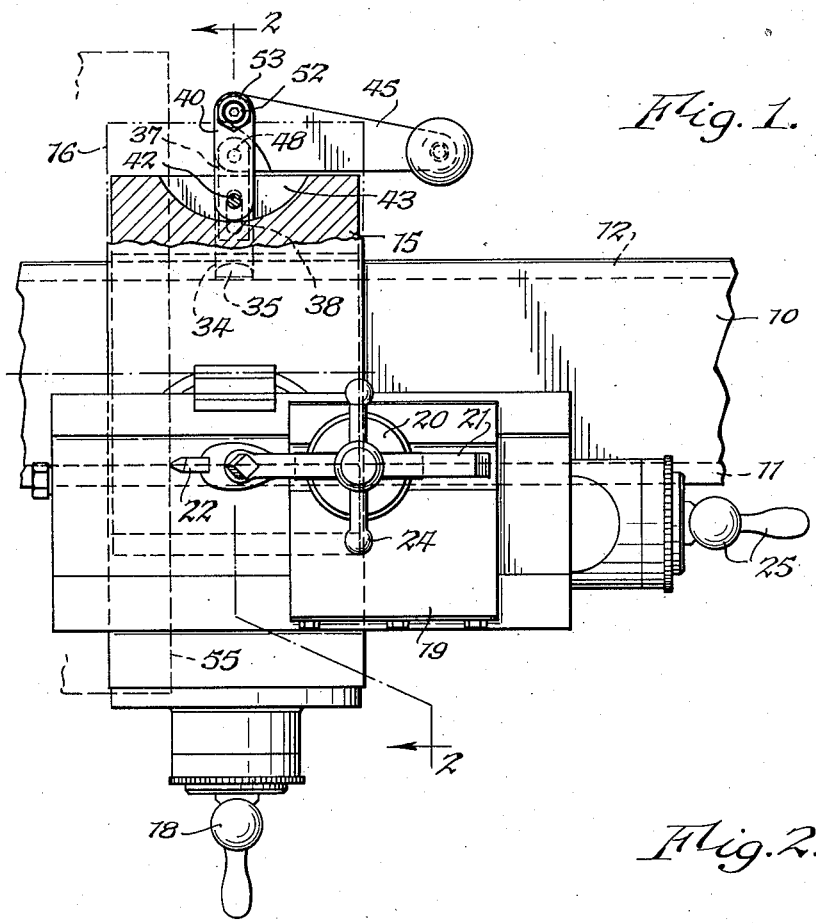
Fig. 1 is a top plan view, partly in section, showing a compound slide rest mounted on the lathe bed by clamping means embodying this invention.
Figure 2:
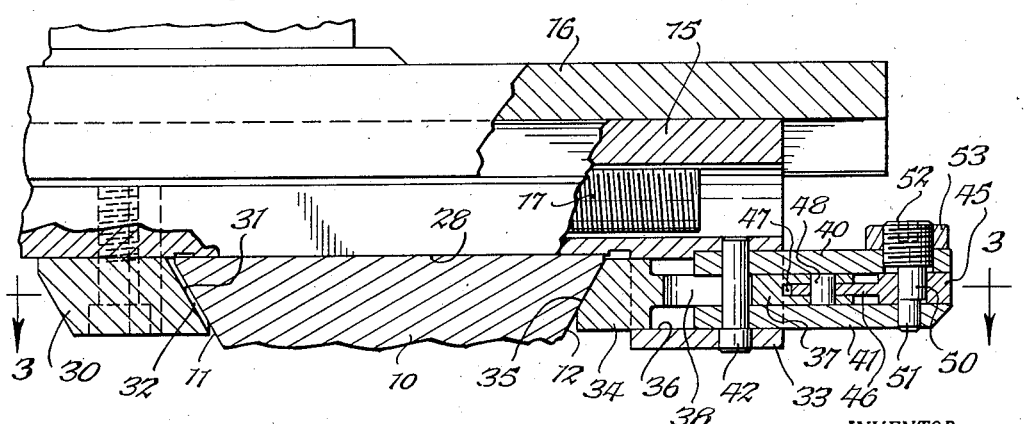
Fig. 2 is a fragmentary section thereof, on line 2—2, Fig. 1, on an enlarged scale.

While I have shown my improvements applied to a lathe, it will be obvious that the particular clamping means forming the subject matter of this invention may be applied to securing any other machine part on a bed of any other type of machine.

10 represents a bed of a lathe or other machine, the bed being of dove-tailed cross section and having a flat upper surface and downwardly converging sides or edge portions 11 and 12. The bed may be mounted on a suitable support (not shown) in any desired manner.

Any suitable or desired machine part may be secured to the bed 10 of the machine and, by way of example, I have shown in the drawings a compound slide rest mounted on a lathe bed.

2

This slide rest includes a slide rest base 15 formed to be secured to the bed 10 and having suitable guide way on which a transverse or cross slide 16 is mounted for accurate movement crosswise of the lathe bed. This transverse or cross slide may be actuated by means of a screw 17 rotatable by means of a suitable handle 18 and connected with the base and cross slide so that turning of the screw imparts movement to the cross slide. The cross slide is provided with suitable guide means for guiding a longitudinal slide 19 on which a tool post or support 20 is mounted, the tool post being formed to receive a cutting tool holder 21 on which the cutting tool 22 is mounted. The tool holder shown may be secured to the tool post by a clamping screw having a handle portion 24 secured thereto. The longitudinal slide 19 may be actuated for movement lengthwise of the bed 10 by any suitable means actuated by a handle 25. The compound slide rest shown does not by itself constitute a part of this invention and may be replaced by any other machine part which it is desired to mount upon the bed 10.

The base 15 of the machine part has a flat lower face 28 formed to engage the flat upper face of the lathe bed 10 and also has a part integral therewith or rigidly secured thereto which engages one of the inclined sides of the lathe bed. In the construction illustrated, a downwardly extending part or bed stop 30 is rigidly secured to the lower face of the slide rest base 15, for example, by means of dowels and screws as shown and the bed stop has a beveled or inclined face 31 formed to engage the side 11 of the bed 10. This bed stop extends lengthwise of the lathe bed a distance substantially equal to the dimension of the slide rest base lengthwise of the lathe bed, and the middle portion of the inclined or beveled face 31 is preferably relieved or recessed as shown at 32 so that only the end portions of the bed stop 30 will engage the bed 10.

At the other side of the lathe bed, the machine part base is provided with a downwardly depending projection or flange 33 which is formed to receive a movable locking bolt or plug having a substantially cylindrical head 34, the outer end of which has an inclined or beveled face 35 formed to engage the inclined or beveled side 12 of the bed. In the particular construction shown, this locking bolt or plug is slidably mounted in a cylindrical bore 36 formed in the flange or extension 33 of the slide rest base. The locking bolt has an extension or shank 37 which may be formed integral therewith which has opposite parallel flat faces.

Suitable means are provided for moving the locking bolt 34 toward and from the beveled edge or side 12 of the bed and for pressing the locking plug securely in engagement with this side of the bed for the purpose of drawing the slide rest base and its bed stop 30 securely into engagement with the upper flat face and the beveled edge or side 11 of the bed, and in the construction shown by way of example for this purpose, I have provided a toggle mechanism, which includes a pair of links 40 and 41 arranged at opposite sides of the flat shank portion 37 of the locking bolt. One end of each of these links is pivotally mounted on a pivot pin 42, which also extends through a slot 38 of the locking bolt and thus holds this bolt against turning, the ends of the pivot pin 42 being arranged in apertures in the slide rest base and the downwardly extending projection 33 thereof. In order to enable these links to enter into this projection 33, it is provided with a pair of recesses or grooves 43 formed therein.

The other ends of the links 40 are pivotally connected to one side of one end of a bell crank lever or handle 45. The other side of the same end of the lever is provided with a part 46 of reduced thickness which enters a slot in a bifurcated end portion 47 of the end of the stem portion 37 of the locking bolt, and a pivot pin 48 pivotally connects this bifurcated end of the locking bolt with the part 46 of the lever or handle.

The links 40 and 41 are preferably connected with the lever 45 by means of an adjustable pivot pin by means of which the relationship of the links to the lever 45 and the locking bolt may be adjusted. In the particular construction shown for this purpose, this pivot pin includes two concentric end portions 51 and 52 and an eccentric bearing portion 50, which bears in a hole formed in the lever 45. The end portion 51 bears in an aperture in the end of one of the links, for example, the lower link 41 and the other end portion 52 is preferably of larger diameter and is threaded to engage in a correspondingly threaded hole in the link 40. It will be obvious that by turning the pivot member, the bearing portion 50 being eccentric with reference to the shank 51 and the threaded portion 52 will change the relationship of the lever 45 with reference to the links 40 and 41, and when the pivot member has been set into the desired position, a lock nut 53 may be tightened against the side of the adjacent link 40 so as to hold the pivot member in the desired position.

In the operation of the clamping device described, it will be obvious that when the parts are in the position shown in Fig. 3, the bolt 37 will be drawn away from the bed 10, thus releasing the machine part on which the bolt is mounted so that the same may be adjusted lengthwise of the bed as desired or may be entirely removed from the bed, since the movement of the bolt is sufficient to clear the bed when the machine part is to be removed therefrom. When the lever 45 is swung into the position shown in Fig. 1, the bolt will be forced against the side 12 of the bed and the lever 45 will be held in this position because of the fact that the two pivotal connections thereon are in dead center position, or in line with the direction of movement of the locking bolt 34, so that there will be no tendency for the lever to be accidentally swung out of this position. By releasing the lock nut 53 and adjusting the screw 52 of the pivot member connecting the links 40 and 41 with the lever 45, the clamping mechanism can readily be adjusted in such manner that when the lever 43 is in the locking position shown in Fig. 1, the locking bolt 43 will be urged against the side of the lathe bed with the desired force.

The construction described provides a three-point bearing of the machine part on the bed, and if the parts are accurately machined and the clamping member correctly adjusted to exert the desired pressure against the bed, the machine part will be very rigidly and securely locked in place on the bed, the locking mechanism having the property of toggle links of exerting the maximum pressure for the force applied to the end of the lever 45 when approaching the dead center position.

The construction described also has the advantage that the clamping means can be very quickly released by merely turning the lever 45 to a small angle from the dead center position to release the pressure exertd by the bolt against the side of the bed. It is not necessary to swing the lever through a quarter of a turn for merely releasing the clamping pressure on the bed, the quarter turn of the lever being used only when it is desired to withdraw the clamping bolt to the maximum extent for removal of the machine part or slide rest from the machine.

The clamping means described have the further advantages that they can be very quickly applied and released by merely turning the lever or handle through a small part of a revolution and these means can be adjusted by means of the eccentric pivot to exert the desired pressure on the bed and to compensate for wear of the pivots. The construction of the clamping mechanism described is such that a machine part is secured to a bed with a high degree of accuracy due to the fact that the clamping mechanism does not produce such strains on the bed or base of the machine part which would cause distortion of the bed or machine part. This is done by having the pressure of the clamping bolt applied to the bed in a direction parallel to the upper surface of the bed. This action of the clamping bolt, consequently, results in a pull on the base 15 of the machine part crosswise of the bed, and such pull will not tend to buckle or otherwise distort the base in such a manner as to interfere with the accuracy of the positioning of the machine part. The inclined faces or sides of the bed cause downward pulls on the base of the machine part on the upper flat face of the bed. The bolt is guided for movement parallel to the flat face of the bed by the cylindrical aperture 36 of the base and the links 40 and 41 in their slots 43 also act on the stem portion 37 of the bolt to hold the same against movement out of planes parallel to the upper flat face of the bed. The construction of the clamping mechanism is such that when used for securing a slide rest to a lathe bed, the cutting tool 22 will cut a flat face of workpiece 55, Fig. 1, mounted on the spindle or face plate of the lathe, and this flatness will be duplicated exactly each time the slide rest is removed from and replaced on the lathe bed.

I claim as my invention:

1. Clamping means for securing to a bed having a flat face and inclined sides converging from said flat face, a machine part having a portion formed to seat on said flat face and a portion on a side thereof for engaging one of said sides of said bed, said clamping means including a clamping bolt guided on said machine part for movement toward and from the other side of said bed, a link pivoted at one end thereof to said machine part, a lever pivoted to said link and said bolt for moving said bolt toward and from said bed, the pivotal connection of said lever and said bolt lying substantially parallel to the direction of movement of said bolt when said bolt is in clamping engagement with said bed.

2. The combination of a machine bed having a flat surface and inclined sides converging from said flat surface, a machine part formed to be secured to said bed and having a base formed to seat on said flat surface of said bed, and portions projecting from said base, one of said projecting portions engaging one side of said base and the other projecting portion spaced from the other side of said base, a clamping bolt guided on said other projecting portion for movement into and out of engagement with the other side of said bed, a link having one end pivotally connected with said other projecting portion and having its pivotal axis intersected by said clamping bolt, and a lever having two pivotal connections, one with the other end of said link and the other with said bolt, for moving said bolt into and out of position to engage the other side of said bed, the pivotal connections of said lever with said link and said bolt being arranged so as to be in dead center position with reference to the direction of movement of said bolt when said bolt is in clamping engagement with said bed.

3. The combination of a machine bed having a flat surface and inclined sides converging from said flat surface, a machine part formed to be secured to said bed and having a base formed to seat on said flat surface of said bed, and portions projecting from said base, one of said projecting portions engaging one side of said base and the other projecting portion spaced from the other side of said base, a clamping bolt guided on said other projecting portion for movement into and out of engagement with the other side of said bed, a link having one end pivotally connected with said other projecting portion and having its pivotal axis intersected by said clamping bolt, and a lever having two pivotal connections, one with the other end of said link and the other with said bolt, for moving said bolt into and out of position to engage the other side of said bed, the pivotal connections of said lever with said link and said bolt being arranged so as to be in dead center position with reference to the direction of movement of said bolt when said bolt is in clamping engagement with said bed, and means for adjusting one of said pivotal connections to adjust the clamping pressure of said bolt against said bed when said lever is in dead center position.

4. The combination of a machine bed having a flat surface and inclined sides converging from said flat surface, a machine part formed to be secured to said bed and having a base formed to seat on said flat surface of said bed, and portions projecting from said base, one of said projecting portions engaging one side of said base and the other projecting portion spaced from the other side of said base, a clamping bolt guided on said other projecting portion for movement into and out of engagement with the other side of said bed, a pair of links each having one end thereof pivotally mounted on said projecting portion, a lever, a pivotal connection between said links and said bolt connecting said lever to said links, another pivotal connection between said lever and said bolt, said pivotal connections being arranged so that the swinging of said lever moves said bolt into and out of clamping engagement with said bed and so that said lever is in dead center position when said bolt is in clamping position, at least one of said pivotal connections having the bearing for said lever eccentric with reference to the bearing for said links, and means for locking said last mentioned pivotal connection in different relations to said lever to vary the pressure exerted by said bolt against said bed when said lever is in dead center position.

5. The combination of a machine bed having a flat surface and inclined sides converging from said flat surface, a machine part formed to be secured to said bed and having a base formed to seat on said flat surface of said bed, and portions projecting from said base, one of said projecting portions engaging one side of said base and the other projecting portion spaced from the other side of said base, and having an aperture therein extending crosswise of said bed, a clamping bolt guided in said aperture for movement toward and from said bed, said bolt having a shank portion with opposite flat faces, a pair of links each pivotally connected at one end thereof to said other projecting portion and lying against the flat faces of said bolt shank to hold said bolt against turning, and a lever having spaced pivotal connections with said two links and with said bolt to move said bolt into and out of clamping relation to said bed.

6. The combination of a lathe having a bed provided with a flat upper surface and inclined sides converging downwardly from said flat surface, a slide rest having a base provided with a flat surface adapted to seat on said flat surface of said base and having a portion extending downwardly into position to engage one of the inclined sides of said bed, a downwardly extending projection on said base arranged in spaced relation to the other side of said bed, a bolt guided on said projection for movement into and out of clamping engagement with said other side of said bed, a pair of links pivotally mounted on said downward projection at opposite sides of said bolt, a lever having one portion thereof pivotally connected with said links and another portion thereof pivotally connected with said bolt and movable into a dead center position in which said bolt is in clamping engagement with said bed and into another position in which said bolt is withdrawn from said clamping position.

DAVID W. STROM.

REFERENCES CITED

The following references are of record in the file of this patent:

UNITED STATES PATENTS

| Number | Name | Date |
| --- | --- | --- |
| 1,620,975 | Kichlman | Mar. 15, 1927 |
| 1,673,163 | Schmelzkopf | June 12, 1928 |
| 1,835,328 | Parsons | Dec. 8, 1931 |
| 1,858,898 | Mesker | May 17, 1932 |
| 2,311,251 | Rees | Feb. 16, 1943 |